US012560190B2

(12) United States Patent
Torriani et al.

(10) Patent No.: US 12,560,190 B2
(45) Date of Patent: Feb. 24, 2026

(54) JOINING TWO OBJECTS

(71) Applicant: WoodWelding AG, Stansstad (CH)

(72) Inventors: Laurent Torriani, Lamboing (CH);
Mario Lehmann, Les Pommerats (CH)

(73) Assignee: WOODWELDING AG, Stansstad
(CH)

( * ) Notice: Subject to any disclaimer, the term of this
patent is extended or adjusted under 35
U.S.C. 154(b) by 460 days.

(21) Appl. No.: 18/005,253

(22) PCT Filed: Jul. 16, 2021

(86) PCT No.: PCT/EP2021/069930
§ 371 (c)(1),
(2) Date: Jan. 12, 2023

(87) PCT Pub. No.: WO2022/013415
PCT Pub. Date: Jan. 20, 2022

(65) Prior Publication Data
US 2023/0250840 A1      Aug. 10, 2023

(30) Foreign Application Priority Data
Jul. 16, 2020    (CH) ..................................... 00881/20

(51) Int. Cl.
*B29C 65/08*        (2006.01)
*B29C 65/00*        (2006.01)
(Continued)

(52) U.S. Cl.
CPC ............ *F16B 11/002* (2013.01); *B29C 65/08*
(2013.01); *B29C 65/5057* (2013.01);
(Continued)

(58) Field of Classification Search
CPC ... F16B 11/002; B29C 65/08; B29C 65/5057;
B29C 66/30223; B29C 66/30326; B29C
66/7392; B29C 66/8322
(Continued)

(56) References Cited

U.S. PATENT DOCUMENTS 6,913,666 B1    7/2005  Aeschlimann et al.
8,167,347 B2    5/2012  Parkinson et al.
(Continued)

FOREIGN PATENT DOCUMENTS

CN          106794635 A      5/2017
DE    10 2009 044 210 A1      4/2011
(Continued)

OTHER PUBLICATIONS

English translation of Chinese Office Action dated Aug. 2, 2025,
Application No. 202180051594.7; 13 pages.

*Primary Examiner* — James D Sells
(74) *Attorney, Agent, or Firm* — Rankin, Hill & Clark
LLP

(57)        ABSTRACT
A tool presses a joining element against a first object into a
first opening of the first object while mechanical vibration
energy is coupled into the first object and the joining
element. Vibration energy and pressing force make the
thermoplastic material of the distal portion of the joining
element flowable and interpenetrates structures of the first
object to yield, after re-solidification, an anchoring of the
distal portion of the joining element in the first object. The
second object is placed so that a proximal portion of the
joining element is inserted into a second opening, and the
first and second objects are pressed against each other while
mechanical vibration energy is coupled into one of the first
and second objects, until thermoplastic material of the
joining element proximal portion is made flowable and
(Continued)

interpenetrates structures of the second object to yield, after re-solidification, an anchoring in the second object.

22 Claims, 7 Drawing Sheets

(51) Int. Cl.
     *B29C 65/50*        (2006.01)
     *F16B 11/00*        (2006.01)

(52) U.S. Cl.
     CPC .. *B29C 66/30223* (2013.01); *B29C 66/30326* (2013.01); *B29C 66/7392* (2013.01); *B29C 66/8322* (2013.01); *B29C 66/30221* (2013.01); *B29C 66/72* (2013.01); *B29C 66/7487* (2013.01)

(58) Field of Classification Search
     USPC ........................................................ 156/73.1
     See application file for complete search history.

(56)              References Cited

U.S. PATENT DOCUMENTS

| | | | |
|---|---|---|---|
| 10,808,740 B2 * | 10/2020 | Mayer ...................... | B21J 15/12 |
| 2019/0077087 A1 | 3/2019 | Gergely et al. | |
| 2019/0126562 A1 | 5/2019 | Mayer et al. | |

FOREIGN PATENT DOCUMENTS

| | | | |
|---|---|---|---|
| EP | 2 928 668 A1 | 10/2015 |
| JP | 3-297629 A | 12/1991 |
| WO | 96/01377 A1 | 1/1996 |
| WO | 98/42988 A1 | 10/1998 |
| WO | 2006/002569 A1 | 1/2006 |
| WO | 2014/075200 A1 | 5/2014 |
| WO | 2015/181300 A1 | 12/2015 |
| WO | 2016/071335 A1 | 5/2016 |
| WO | 2019/197501 A1 | 10/2019 |

* cited by examiner

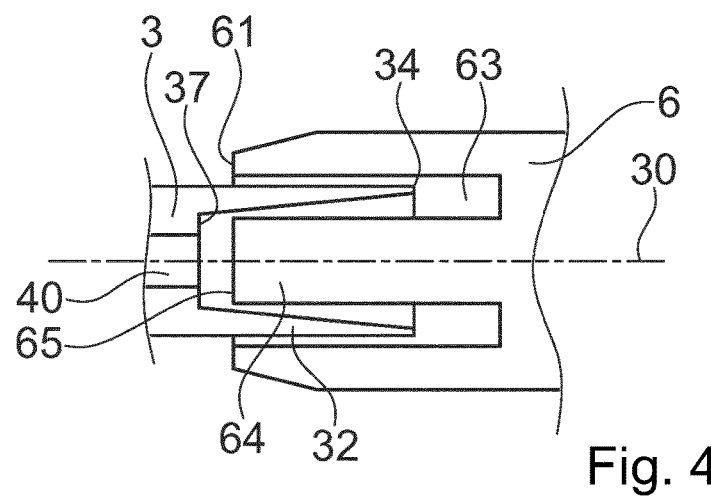
Fig. 4
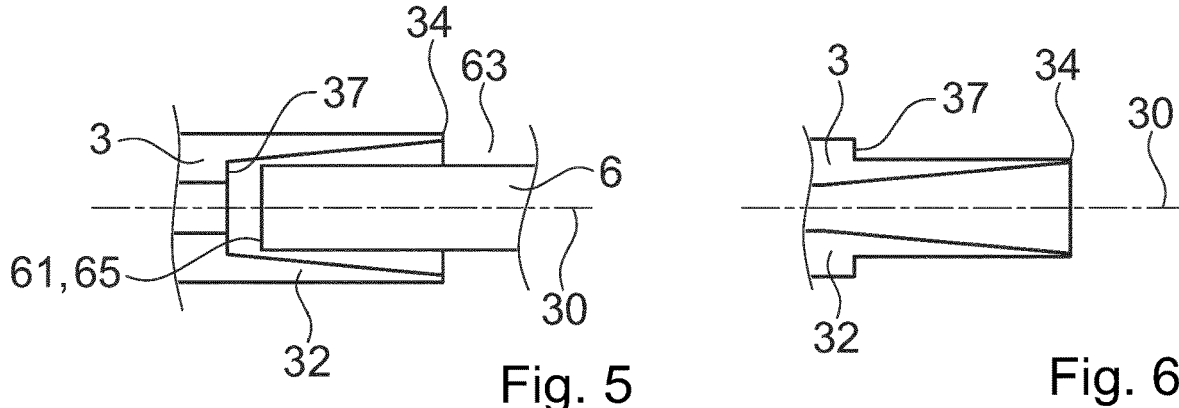
Fig. 5            Fig. 6
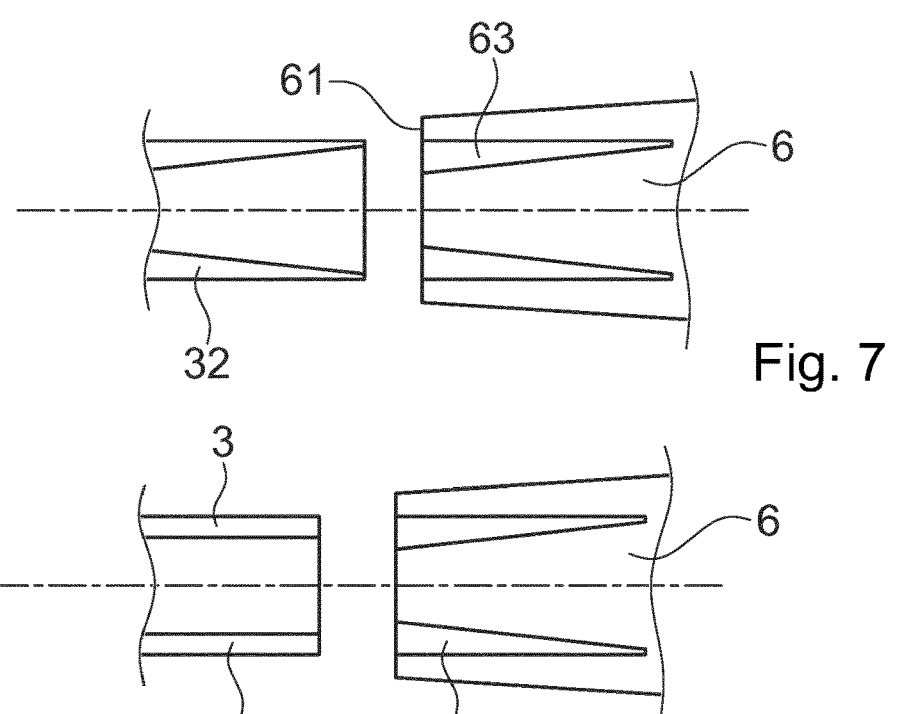
Fig. 7
Fig. 8

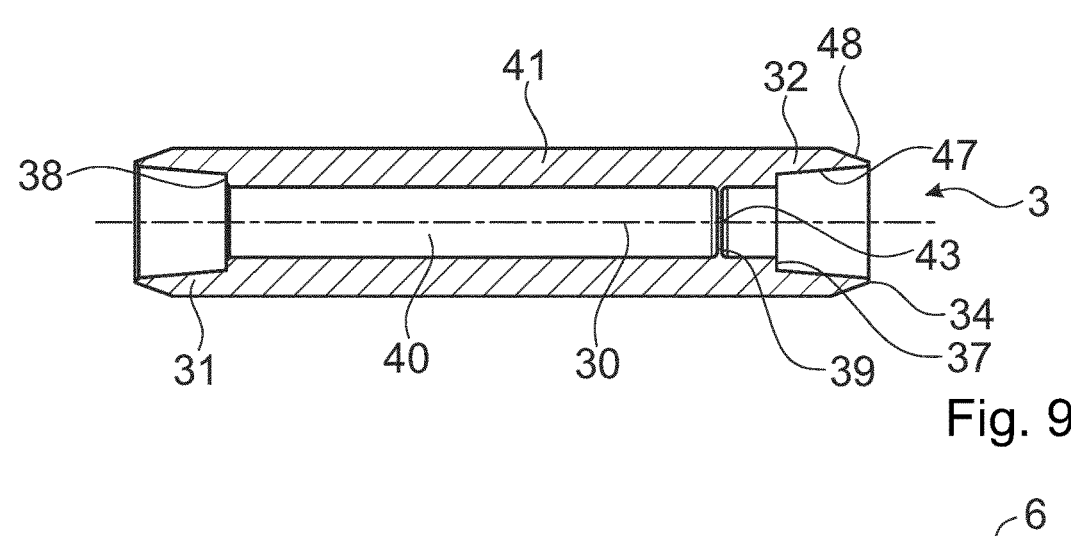
Fig. 9
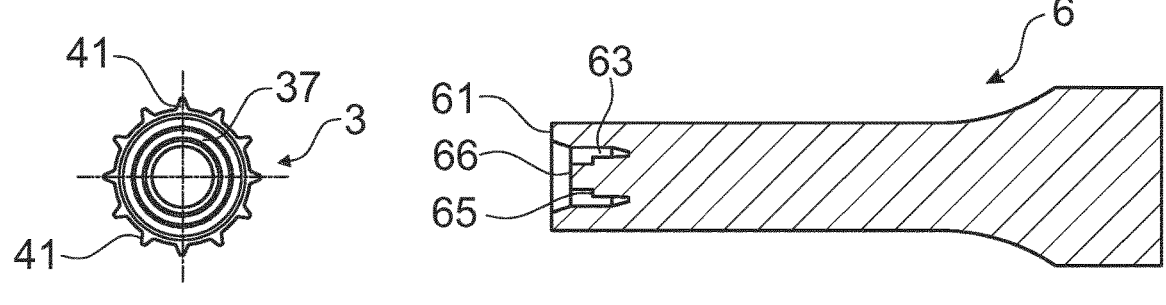
Fig. 10
Fig. 11
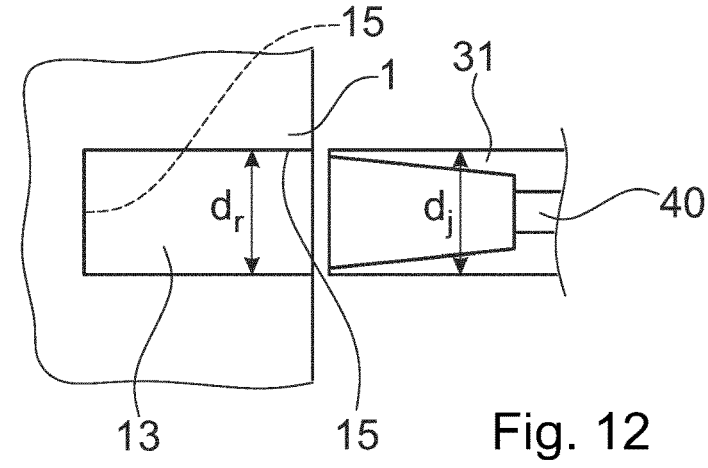
Fig. 12
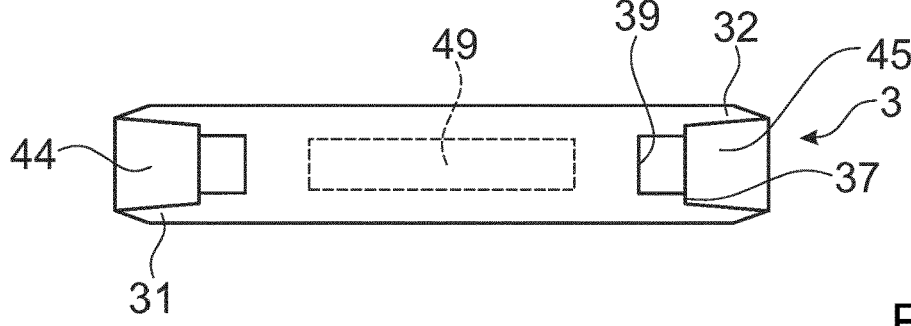
Fig. 13

JOINING TWO OBJECTS

BACKGROUND OF THE INVENTION

Field of the Invention

The invention is in the field of mechanical engineering and construction and concerns a method for joining two objects by means of a joining element, as well as a joining element and a kit of parts. The joining element includes a material having thermoplastic properties and the method includes the application of energy, such as mechanical vibration, e.g. ultrasonic vibration.

Description of Related Art

WO 2006/002569 discloses a method of joining two objects, for example of wood, with the aid of a joining element including a thermoplastic material at least in the region of its distal and proximal ends. Two blind holes facing each other are provided in the two objects, and the joining element is positioned in the blind holes such that its distal and proximal ends are in contact with the bottom faces of the blind holes. The length of the joining element and the depths of the blind holes are adapted to each other such that there is a gap between the two objects in this situation. This assembly is then positioned between a support and a sonotrode. The sonotrode and the support are forced towards each other, while the sonotrode is vibrated. Thereby, at least part of the material having thermoplastic properties is liquefied where the joining element ends are pressed against the bottom faces of the holes. As a result, the liquefied material is caused to infiltrate into pores of the hole surfaces or unevennesses or openings provided in the hole surfaces. After re-solidification of the thermoplastic material, the joining element ends are thus anchored in the objects. For achieving suitably similar anchorage qualities at the two joining element ends the distal end of the joining element has a smaller face area and includes less thermoplastic material than the proximal end of the joining element.

As an alternative to forcing a sonotrode and a non-vibrating support against each other, it is also possible to make the support vibrating, i.e. to cause the first and second objects to be pressed together by two vibrating sonotrodes. By this, the efficiency of the process is even higher compared to the asymmetric configuration with just one vibrating support. Especially in such a configuration with the, the joining element need not be asymmetric between the proximal and distal ends but may be symmetric, which simplifies the process.

In both situations, with asymmetric and with symmetric joining elements, it may be difficult to control the flow characteristics of the joining element.

DE102009044210 discloses a method of fastening a thermoplastic dowel relative to a lightweight building board, wherein the dowel includes a thermoplastic sheath and a stud of a different material. Fastening to the board can be done by ultrasonic energy in one step or alternatively in two steps, wherein in a first step the sheath is anchored relative to the board, and in a second step, the stud is welded to the sheath.

DE102018122399 discloses a method and devices for connecting a first and a second component by an amalgamation plate. In this, the first and second components include a thermoplastic material which is heated during the process of connecting until it melts such that material from the component flows through a portion of the amalgamation plate and solidifies to hold the amalgamation plate in relation to the component. In addition, an adhesive that can be in contact with the amalgamation plate can be applied between the first component and the second component. This process is suitable only for attaching flat components of thermoplastic material to each other, and the amalgamation plate has an according plate-like shape with sharp structures protruding from the plate on both sides and is placed between the components. The sharp structures are, after the process, embedded in thermoplastic material, and therefore for the approach to work, it is important that they remain intact also when the heat is applied. All of this restricts possible application of the teaching of DE102018122399.

SUMMARY OF THE INVENTION

The object of the present invention is to provide a method for joining two objects by means of a joining element, which method overcomes at least some of the disadvantages of the prior art and which provides reproducible results also in situations where the properties of the objects to be joined are not fully predictable. It is a further object to provide a joining element for this purpose and a kit of parts including such joining element.

According to an aspect of the invention, a method of joining a first object and a second object with the aid of a joining element is provided. The joining element extends between a distal end and a proximal end and has a thermoplastic material. The first object has a first opening, for example being a first blind hole, and the second object has a second opening, for example being a second blind hole. In this, the first and/or second openings may be made before or during the process. In this, the two blind holes may have the same depth or different depths.

The method firstly includes providing the first object and positioning the joining element relative to the first object. For example, the first object may have a first opening, and then the step of positioning includes inserting a distal portion with the distal end of the joining element in the first opening.

Then, for anchoring the joining element relative to the first object, a tool is used to press the joining element against the first object into the first opening while energy, for example mechanical vibration energy, is coupled into the assembly that includes the first object and the joining element (i.e., into the first object or the joining element or both, the first object and the joining element). In this, the tool extends between a proximal tool end and a distal tool end face, and during the step of coupling of the energy into the assembly, the proximal end of the joining element is proximally of the distal tool end face, with a pressing face of the tool abutting against an abutment face of the joining element, which abutment face is distally of the proximal end. By the joint effect of the energy and the pressing force, thermoplastic material of the distal portion of the joining element is made flowable and flows into a structure of the first object in a vicinity of the first opening to yield, after re-solidification, an anchoring of the distal portion of the joining element in the first object.

Thereafter, the second object is placed relative to the first object. The second object may have a second opening, and then placing may result in a proximal portion of the joining element with the proximal end being inserted into the second opening. In this configuration, the first and second openings may be aligned with each other (fall in line). A gap remains between the first and second objects after the placing. Then, the first and second objects are pressed against each other while mechanical vibration energy is coupled into at least one of the first and second objects, for example at least into the second object, until thermoplastic material of the proximal portion of the joining element is made flowable and flows into a structure of the second object in a vicinity of the second opening to yield, after re-solidification, an anchoring in the second object.

Thereby, what may result is that the first and second openings, which may be aligned with each other, after the process form a common hollow space in which the joining element is, the joining element being anchored relative to both, the first object in the first opening and the second object in the second opening—whereby the joining element may serve as a kind of 'hidden dowel'.

The joining element may for example be pin-like, with a larger extension in proximodistal direction than in other directions. In alternative embodiments, the joining element is not necessarily pin-like as a whole but includes a first and a second pin-like portion being formed by the distal portion and the proximal portion, respectively.

Especially, the first object may have a proximal surface portion, with the first opening having a mouth in the proximal surface portion. The second object may have a distal surface portion, with the second opening having a mouth in the distal surface portion. After the step of placing the second object, the distal surface portion of the second object faces the proximal surface portion of the first object. After the step of pressing the first and second objects against each other, the proximal surface portion and the distal surface portion are in physical contact with each other, or alternatively there remains a gap between these surface portions that face each other.

Accordingly, by the pressing the first and second objects against each other, in addition to this anchoring, the gap between the first and second objects may be closed. In alternative embodiments, the gap is not closed, but is reduced in size.

In contrast to the approach taught in WO 2006/002569, therefore, anchoring of the joining element with respect to the first object is separated from anchoring it with respect to the second object. Thereby, both anchoring steps may be carried out in a well-defined manner and resulting in a connection with well-defined amounts of thermoplastic material that have liquefied and re-solidified and in well-defined contracting and/or other deformation of the joining element, thus resulting in well-defined fixations—independent on whether or not material properties and other parameters are equal between the first and second objects and between different first objects/different second objects. The method is thus especially also suitable for joining objects that have been produced in an economical manner without any necessity of optimization of reproducibility.

Nevertheless, even if the joining element is first anchored in the first object, which anchoring involves the joining element being pressed towards distally, the proximal portion of the joining element due to the approach with the abutment face—and as described in more detail hereinafter—may remain or even obtain, during this first anchoring step, a shape suitable for the second anchoring step in the second object.

Anchoring in the first/second object by material of the joining elements flowing into a structure of the first/second object and re-solidifying may at least partially be an anchoring by a positive-fit connection in that the re-solidified thermoplastic material cannot, without being disrupted, pulled out of the structure it interpenetrates. Depending on the material of the first/second object, it may also include a material connection (integral joint) by the thermoplastic material being substance-to-substance connected to material of the first/second object.

The flowing of the thermoplastic material into a structure of the first/second object may especially include causing the thermoplastic material to interpenetrate structures, especially irregular structures of the first/second object. In addition or as an alternative, the structure may include a premade cavity with an undercut, the cavity having a well-defined volume, substantially as described in WO 2014/075200, especially referring to FIGS. 19*a*, 19*b* and 20.

A possible design criterion for the joining element concerns the abutment face. In many embodiments, it may be advantageous if an overall area of the abutment face is greater than an area of the distal end. Thereby, it may be ensured that the melting process in the first anchoring step sets in at the distal end, in contact with the first object, and not at the interface between the tool and the joining element.

Applications of the method described herein include the production of furniture, both, flat-pack furniture (i.e., pieces of furniture to be assembled by the user) as well as pre-assembled furniture. Further uses include the building industry, for example manufacturing of doors, window frames, etc., as well as manufacturing caravans and RVs. Other applications, such as in the car manufacturing industry or other industry are possible, too.

The tool may be a sonotrode, with the pressing face being an outcoupling face. Then, at least a fraction of the energy, then being mechanical vibration energy, (for example all mechanical vibration energy) is coupled into the joining element by the sonotrode, which is vibrating while being pressed against the joining element.

In this group of embodiments, the sonotrode and an apparatus that generates the vibration and include the sonotrode just have to be adapted to the shape and dimensions of the joining element only, and same joining elements may be used for joining different kinds of objects. In a first subgroup of embodiments of this group, the first object may be pressed against a non-vibrating support during this process of anchoring the joining element in the first object. This includes the possibility of using a hand-held device as the apparatus that includes the sonotrode and further includes a vibration generator. In a second sub-group of embodiments, a portion of the vibration energy may be coupled directly into the first object by the support being itself a vibrating sonotrode.

In a group of alternative embodiments, the tool may be a pressing tool without any vibrations being coupled into the tool while the same is pressed against the joining element, and energy is coupled into the assembly in a different way. An example of such a different way is to use a sonotrode to couple the vibration energy into the first object during the step of using the tool to press the joining element towards distally. Other ways include the use of a source of electromagnetic energy, such as a laser, a coil for generating an alternating magnetic field, or an electrode, together with providing the thermoplastic material with accordingly absorbing properties, for example by a filler.

The abutment face of the joining element faces towards proximally and may for example include at least a portion that is essentially perpendicular to a proximodistal axis. The abutment face may include a shoulder, for example an inner shoulder. It is also possible that the abutment face has several abutment face portions, for example an inner and an outer shoulder, and/or shoulders at different axial positions, such as in an arrangement with several steps.

The tool, by which the pressing force is coupled into the joining element, has the distally facing pressing face. If the tool is a sonotrode, the pressing face is an outcoupling face via which the vibration energy is coupled from the sonotrode into the joining element. The pressing face may be a distal end face or may be offset towards proximally with respect to the distal sonotrode end.

The tool may have a recess that has a mouth in the distal end face, in which recess the proximal portion of the joining element is received during the step of pressing the joining element towards distally. Such a receiving recess may especially have a ring-shaped cross section to receive the proximal portion of the joining element if this proximal portion is hollow and tube shaped to form a proximal crown extending circumferentially around a central hollow space, which may be a central hollow space extending axially across the joining element or may be or a proximal/distal recess of the joining element. Then, a portion radially-inwardly of the receiving recess may include the pressing face or at least a portion thereof, to cooperate with the abutment face that is radially-inwardly of the proximal portion and is for example an inner shoulder, or is a bottom face of a proximal/distal recess.

Instead of extending circumferentially around the central hollow space in a continuous manner, a crown may be formed by a plurality of teeth extending around the central hollow space.

In addition or as an alternative to an inner shoulder, the abutment face may include an outer shoulder.

Generally, the abutment face may be viewed as belonging to an interaction zone between the tool and the joining element, which interaction zone is distally of the proximal end of the joining element.

In embodiments, the shapes of the joining element proximal portion and of a distal recess of the tool are adapted to each other at least partially so that the proximal portion lies against the inner surface of the recess along a large proportion of its surface. In such a configuration, different parts of the surface being at different angles to the axis may belong to the abutment surface.

Optionally, a recess of the tool of the described kind that receives the proximal portion may be used as a mold part at least partially shaping the proximal portion for the subsequent step in which the proximal portion is used to fix the joining element to the second object when the second object and the first object are pressed against each other, with the joining element in the respective first and second openings.

Such shaping of the proximal portion of the joining element may also take place by a protruding portion of the tool that that during the step of using the tool to press the joining element towards distally, extends past the proximal portion of the joining element, for example on one side only (such as on the inner side only or the outer side only).

Independent on whether or not the tool has a distal recess, portions proximally of the abutment face may form a proximal crown which may extend around the proximodistal axis. Such crown extends circumferentially around a central hollow space (which may be a hollow space going axially through the joining element or may be a proximal recess). It may proximally end in a continuous edge, or it may be discontinuous so that the crown for example has a plurality of teeth.

More in general, the joining element in many embodiments has, at least after the step of pressing and for example also prior thereto, a distal energy proximal feature which may include at least one proximal blade-like protrusion ending in an edge and/or at least one tip. A proximal blade-like protrusion may be formed by a crown of the above-described kind.

The joining element may also have a distal crown. More in general, the joining element in many embodiments has a distal energy directing feature which may include at least one distal blade-like protrusion ending in an edge (for example formed by a distal end of the distal crown or other for example blade-shaped distally protruding feature) and/or at least one tip.

In addition or as an alternative, at least after removal of the tool that is used to press the joining element towards distally (which tool, as mentioned, may optionally be used to also shape the proximal end), the proximal portion of the joining element may have a proximal energy directing feature, which may include at least one edge (for example formed by a proximal end of the proximal crown) and/or at least one tip.

In embodiments, the joining element is symmetrical with respect to a middle plane perpendicular to the proximodistal axis so that the joining element can be inserted in the first opening either way. However, also if the joining element is essentially symmetrical, if it is hollow and tube-shaped, a partition member extending transversally across the inner space, however, can be arranged asymmetrically with respect to the middle plane. Such partition member may for example be membrane-like or plate-like.

The joining element may include energy directors on an outer, lateral surface also. Such energy directors are of the thermoplastic material and may for example be axially running ribs, for example distributed equally around the periphery. A diameter of the joining element including these energy directors may be approximately equal to or slightly larger than a diameter of the first and/or second opening. Such energy directing ribs assist in liquefying the portions of the thermoplastic material of the joining element in contact with the circumferential wall of the respective opening, whereby portions of the thermoplastic material interpenetrate structures of the first and/or second object in a vicinity of the circumferential walls.

The first and/or second openings may be blind holes, and steps of using the tool to press the joining element towards distally and of pressing the first and second object against each other may include pressing the joining element against bottom faces of the first/second opening, respectively. What results after the joining process may include thermoplastic material of the joining element interpenetrating material of the first object/second object at the respective bottom face.

As an alternative, if the dimensions of the joining element and the respective opening are adapted to each other for a press-fit, then this is not a necessity. Rather, based on the principle taught in WO 2015/181300 anchoring may take place also around the circumferential wall also.

A special group of embodiments concerns embodiments, in which the gap between the first and second objects is not closed as a result of the pressing the objects against each other, but is the gap is just reduced in size. Also in these embodiments, the first and/or second objects may include a first opening/second opening, respectively, in which the distal portion/proximal portion of the joining element is inserted. Thus, the gap is different from a gap that arises if an element is just placed between flat surfaces of the first/second object by the element preventing the first/second object from getting in physical contact.

For example, the remaining gap may be used as an adhesive gap. In this way, the present invention may solve a problem of existing processes that involve connecting objects by an adhesive bond. Adhesive connections may be, depending on the surface properties of the objects to be connected, relatively strong and stable but suffer from the drawback that they substantially delay the industrial manufacturing process and hence necessitate the presence of substantial storing space for storing assemblies during manufacturing until the bond is hardened. The approach according to the present invention features the advantage that the bond via the joining element secures immediate initial stability so that the assembly of the first and second objects may be further processed immediately, and the adhesive may slowly harden during the subsequent steps without delaying the process.

Other uses of a remaining gap may include the arrangement of functional elements in the gap, such as a hinge, an anchoring location for connecting to a further object, etc.

In this special group of embodiments, the joining element itself may be shaped to define the width of the remaining gap by including a spacer portion that laterally protrudes to form stop surfaces for the first and second objects when they are pressed against each other.

Alternatively, a recess may be provided in the first and a second object so that the functional elements extend from between the first and second object, while no gap is formed, meaning the first and second object abut.

The concept of using a connection between a first and second object by a joining element, in which connection a gap remains between the first and second objects (the gap especially defined by a spacer portion of the joining element) may be used independent of the two-step procedure that includes the first anchoring step (of the joining element being anchored relative to the first object) and the second anchoring step (of the second object being pressed against the first object with the joining element). Rather, the concept may also be used in a set-up in which the anchoring of the joining element relative to the first object and anchoring of the joining element relative to the second object take place simultaneously, for example substantially as described in WO 2006/002569.

Therefore, according to a second, further aspect, the present invention concerns a method of joining a first and a second object with the aid of a joining element, the method including the steps of:

Providing the first object and the second object;

Providing the joining element, the joining element extending between a distal end and a proximal end and including a thermoplastic material;

Positioning the joining element relative to the first object and relative to the second object such that according to a first option the distal end of the joining element is in contact with the first object (to be anchored therein in the subsequent step of pressing and coupling vibration energy into the assembly) and according to a second option, the distal end of the joining element is anchored in the second object (for example according to the first aspect, or alternatively in accordance with a conventional approach), such that the proximal end of the joining element is in contact with the second object, and such that there is a gap between the first and second objects, the gap having an initial gap width;

pressing the first and second objects against each other while mechanical vibration energy is coupled into at least one of the first and second objects, until a portion of the thermoplastic material belonging to a proximal portion of the joining element, the proximal portion including the proximal end, is made flowable and is caused to flow into a structure of the second object to yield, after re-solidification, a fixation between the joining element and the second object, wherein as a result of the step of pressing the first and second objects against each other, the first and second objects are moved towards each other until the gap has a smaller final gap width, which final gap width is different from zero.

In accordance with the first option, the step of pressing the first and second objects against each other while mechanical vibration energy is coupled into at least one of the first and second objects causes a portion of the thermoplastic material belonging to a distal portion of the joining element, the distal portion including the distal end, is made flowable and is caused to flow into a structure of the first object to yield, after re-solidification, a fixation between the joining element and the first object. Thus, in accordance with the first option of this second aspect, the joining element is anchored essentially simultaneously relative to the first and second objects by the first and second objects being pressed against each other while the energy impinges.

The joining element may consist of the thermoplastic material. Joining elements consisting of thermoplastic material may be manufactured in a cost efficiently, for example by injection molding. Alternatively, the joining element may include, in addition to the thermoplastic material, a portion of a different material, for example a material that is not liquefiable or liquefiable only at a substantially higher temperature (for example higher by at least 50°) than the thermoplastic material. Such additional portion may for example be a core, especially a metallic core. It may make the joining element more stable, for example with respect to absorbing shear forces between the first and second objects.

The properties of the joining element discussed hereinbefore referring to the first aspect of the invention may apply also to a joining element according to the second aspect. Especially, the first and second aspects (second option thereof) may be combined.

The first and second objects may especially be made of wood or a wood composite. More in general, the first and/or second object may include a wood-based material, such as chipboard, particle board, cardboard, fibre board, such as High Density Fibre board (HDF) and Medium Density Fibre board (MDF), or wood (also in the form of plywood). In this text "chipboard" is also used to refer to any composite materials manufactured by mixing wood particles of any shape with adhesives, independent of the product's shape, and including for example oriented strand board.

More in general, in embodiments that include interpenetration of structures of the first/second object by the thermoplastic material of the joining element, the materials of the first and/or second objects are solid and may be penetrable by the thermoplastic material when the latter is in a liquefied state (i.e. the respective first/second object materials are fibrous or porous, includes penetrable surface structures or cannot fully resist such penetration under pressure). Such penetrable material may be rigid and substantially not elastically flexible (no elastomer characteristics). It further includes (actual or potential) spaces into which the liquefied material can flow or be pressed for the anchoring. It is, e.g., fibrous or porous or includes penetrable surface structures which are, e.g., manufactured by suitable machining or by coating (actual spaces for penetration). Alternatively the penetrable material is capable of developing such spaces under the hydrostatic pressure of the liquefied thermoplastic material, which means that it may not be penetrable or only to a very small degree when under ambient conditions. This property (having potential spaces for penetration) implies e.g. inhomogeneity in terms of mechanical resistance. An example of a material that has this property is a porous material whose pores are filled with a material which can be forced out of the pores, a composite of a soft material and a hard material or a heterogeneous material (such as wood) in which the interfacial adhesion between the constituents is smaller than the force exerted by the penetrating liquefied material. Thus, in general, the penetrable material includes an inhomogeneity in terms of structure ("empty" spaces such as pores, cavities etc.) or in terms of material composition (displaceable material or separable materials).

Especially, the materials of the first and second objects are not only solid at ambient temperature, but is such that do not melt, at least not to a substantial degree, under the conditions that apply when the first material penetrates the surface structures.

A thermoplastic material suitable for joining element is, under the conditions prior to transferring the energy, also solid in the sense as above described for the penetrable material. It preferably includes a polymeric phase (especially C, P, S or Si chain based) that transforms from solid into liquid or flowable above a critical temperature range, for example by melting, and re-transforms into a solid material when again cooled below the critical temperature range, whereby the viscosity of the solid phase is several orders of magnitude (at least three orders of magnitude) higher than of the liquid phase. The thermoplastic material will generally include a polymeric component that is not cross-linked covalently or cross-linked in a manner that the cross-linking bonds open reversibly upon heating to or above a melting temperature range. The polymer material may further include a filler, e.g., fibres or particles of material that has no thermoplastic properties or has thermoplastic properties including a melting temperature range which is considerably higher than the melting temperature range of the basic polymer.

Examples for the thermoplastic material applicable in the method according to the invention are thermoplastic polymers, co-polymers or filled polymers, wherein the basic polymer or co-polymer is e.g. polyethylene, polypropylene, polyamides (in particular Polyamide 12, Polyamide 11, Polyamide 6, or Polyamide 66), Polyoxymethylene, poly-carbonateurethane, polycarbonates or polyester carbonates, acrylonitrile butadiene styrene (ABS), Acrylester-Styrol-Acrylnitril (ASA), Styrene-acrylonitrile, polyvinyl chloride, polystyrene, or Polyetherketone (PEEK), Polyetherimide (PEI), Polysulfon (PSU), Poly(p-phenylene sulfide) (PPS), Liquid crystal polymers (LCP) etc. LCPs are of particular interest since their sharp drop in viscosity during melting enables them to penetrate in very fine spaces in the penetrable material.

At least if the joining element is fully made of the thermoplastic material, it may have an elasticity coefficient (at ambient temperature) of at least 0.5. GPa or preferably of at least 1.0 GPa.

Mechanical vibration or oscillation suitable for the method according to the invention has preferably a frequency between 2 and 200 kHz (even more preferably between 10 and 100 kHz, or between 20 and 40 kHz) and a vibration energy of 0.2 to 20 W per square millimeter of active surface. The vibrating tool (e.g. sonotrode) is e.g. designed such that its contact face oscillates predominantly in the direction of the tool axis (longitudinal vibration) and with an amplitude of between 1 and 100 μm, preferably around 30 to 60 μm. Such preferred vibrations are e.g. produced by ultrasonic devices as e.g. known from ultrasonic welding.

According to a further, third aspect, which is a modification of the first aspect, for the first anchoring step the process substantially as described in WO 2016/071 335 is used. In this, it is the first object that has thermoplastic material, and the joining element has structures capable of being inter-penetrated by material of the first object which due to the impact of the energy is made flowable and caused to interpenetrate the structures of the joining element to yield, after re-solidification, the anchoring of the joining element in the first object.

The method according to the third aspect may thus be a method of joining a first and a second object with the aid of a joining element, the method including the steps of:

Providing the first object, the first object including a thermoplastic liquefiable material in a solid state;

Providing the joining element, the joining element extending between a distal end and a proximal end, the joining element including a distal portion with the distal end, the distal portion including a surface portion that has a coupling structure with an undercut and/or is capable of being deformed to include such a coupling structure with an undercut, whereby the distal portion is capable of making a positive-fit connection with the first object, and the joining element including a proximal portion that includes a thermoplastic material;

Positioning the joining element relative to the first object;

Using a tool to press the joining element towards distally relative to the first object while energy is coupled into the first object and/or the joining element, until a flow portion of the thermoplastic material of the first object is liquefied and flows into the coupling structures of the joining element to yield, after re-solidification, an anchoring of the distal portion of the joining element in the first object; wherein during the step of coupling of the energy into the first object and/or the joining element, a pressing face of the tool abuts against an abutment face of the joining element, which abutment face is distally of the proximal end;

Providing the second object;

Placing the second object relative to the first object; and pressing the first and second objects against each other while mechanical vibration energy is coupled into at least one of the first and second objects, until a second portion of the thermoplastic material belonging to a proximal portion of the joining element, the proximal portion including the proximal end, is made flowable and is caused to flow into a structure of the second object to yield, after re-solidification, a fixation between the joining element and the second object.

To this end, especially the distal portion of the joining element may be specifically be equipped for being anchored in a thermoplastic first object, for example by including a material that is not liquefiable under the conditions that exist during the first anchoring step. For example, the material of the distal portion may be metallic. A structure of the distal portion may be of any kind described in WO 2016/071 335, there referring to the second object or in WO 2019/197 501, therein referring to the connector. The proximal portion may be equipped as described referring to any embodiment of the first aspect of the present invention and described in this text.

The invention also concerns a joining element having the properties that make it useful for the method described in this text. Especially, such joining element may have any characteristic or combination of characteristics of joining elements used in methods described in this text.

The invention moreover concerns a kit of parts including a tool (sonotrode) as used in such a method, together with one or more joining elements.

The sonotrode used in the second anchoring step in which the first and second objects are pressed against each other may be a different, sonotrode, for example with a larger outcoupling face than the outcoupling face of the sonotrode used in the first anchoring step. However, it would be possible also that in the second step the same first sonotrode is used again.

An apparatus to which the first sonotrode is coupled may optionally be a handheld apparatus, with the pressing force applied for pressing the joining element towards distally against the first object being a manually generated pressing force. However, the apparatus may alternatively be more sophisticated and include a working frame and a mechanism for generating this pressing force. In either case, a manufacturing facility may include further equipment, including conveying equipment for conveying the first and second objects and the assembly that results after the process, a feeding equipment etc.

In this text, the terms "radial" and "axial" are to be understand as relating to the proximodistal axis which may, during the process, coincide with the respective opening axis of the first/second opening.

BRIEF DESCRIPTION OF THE DRAWINGS

The invention and embodiments thereof are described in further detail in connection with the appended drawings that are all schematical. Same reference numbers refer to same or analogous elements. In the drawings:

FIGS. 4-8 show details of the proximal portion of the joining element, in FIGS. 4, 5, 7 and 8 together with a distal portion of the sonotrode;

FIGS. 9 and 10 show a joining element in longitudinal section and a side view, respectively;

FIG. 11 depicts a sonotrode 11 for the joining element of FIGS. 9 and 10, in a different scale;

FIG. 12 illustrates a detail of a distal portion of a joining element together with an opening in a first object;

FIG. 13 illustrates an alternative joining element that is not hollow;

DESCRIPTION OF THE PREFERRED EMBODIMENTS

Figure 1:
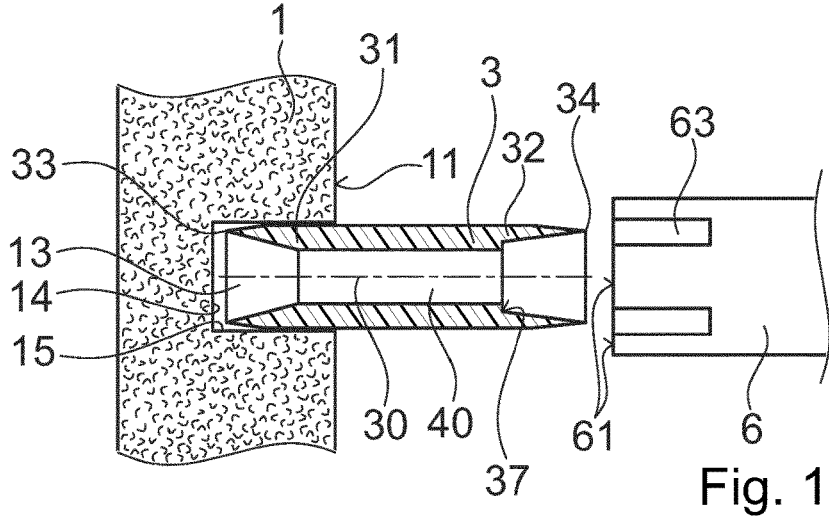
FIG. 1 illustrates, in cross section, a configuration of a first object, a connector and a sonotrode.

FIG. 1 shows a first object 1 with a proximal surface 11 and with a blind hole 13 having a mouth in the proximal surface 11 and having a bottom face 14 and a circumferential surface 15.

The first object here is illustrated to be a board of a wood composite material, with the proximal surface being a large-side surface of the board. However, the teaching referring to the depicted figures is applicable to first and second objects of any shape, and to openings having any position, including blind holes in a small-side surface of a board.

FIG. 1 also illustrates a joining element 3 being generally hollow and tube-shaped, so that an inner hollow space 40 is formed, and for example essentially symmetrical about a proximodistal axis 30, with the possible exception of energy directing ribs extending along the outer surface, as described hereinafter. A thickness of the tube forming the joining element 3 is continuously reduced towards the distal and proximal ends, i.e. it tapers off towards distally and proximally, so that the distal end 33 and the proximal end 34 each form an edge.

The shape of the joining element with the distal portion tapering off towards a distal edge also ensures that the design criterion mentioned hereinbefore is fulfilled, namely that the area of the abutment face 37 (see also the description hereinafter) is greater than the interface area between the distal end 33 of the joining element and the bottom of the blind hole in the first object.

In the depicted embodiment, the joining element is asymmetrical with respect to a middle plane perpendicular to the proximodistal axis 30 in that a distal portion 31 and a proximal portion 32 are shaped differently. As an alternative, the joining element may also be symmetrical with respect to this plane.

Both, the distal portion 31 and the proximal portion 32 each form a crown for anchoring the joining element in the first object 1 and a second object 2 as described hereinafter.

FIG. 1 also illustrates a tool being a first sonotrode 6. The first sonotrode 6 forms a distal end face 61 and a distal recess 63 in the distal end face, which distal recess 63 has a shape adapted to the proximal portion 32 of the joining element 3 so as to receive the proximal portion.

FIG. 4 shows a detail of the proximal portion 32 of the joining element and of a distal end portion of the sonotrode 6. A proximally facing inner shoulder forms an abutment face 37. When the sonotrode is pressed towards distally against the joining element, an inner portion 64 of the sonotrode presses against the abutment face, whereby the pressing force and vibration energy may be coupled into the joining element without the proximal crown that is proximally of the abutment face 37 and that is received in the distal recess 63 being deformed. The region around the abutment face thereby serves as force and energy receiving zone.

In FIG. 4, the abutment face 37 is illustrated to be perpendicular to the proximodistal axis. It would, however, also be an option to configure an abutment face to be slightly inclined, forming an outward or inward taper, whereby during the process the pressing force generates a slight inward or outward force on the joining element, respectively. More in general, the abutment face may have any shape suitable for absorbing the pressing force and, if the tool is a sonotrode, for transmitting, together with the outcoupling face of the sonotrode, the mechanical vibration energy. This includes the hereinbefore discussed possibility of the abutment face including several separate sections, such as several steps, an outer and an inner shoulder, portions distributed around the circumference, etc.

Figure 2:
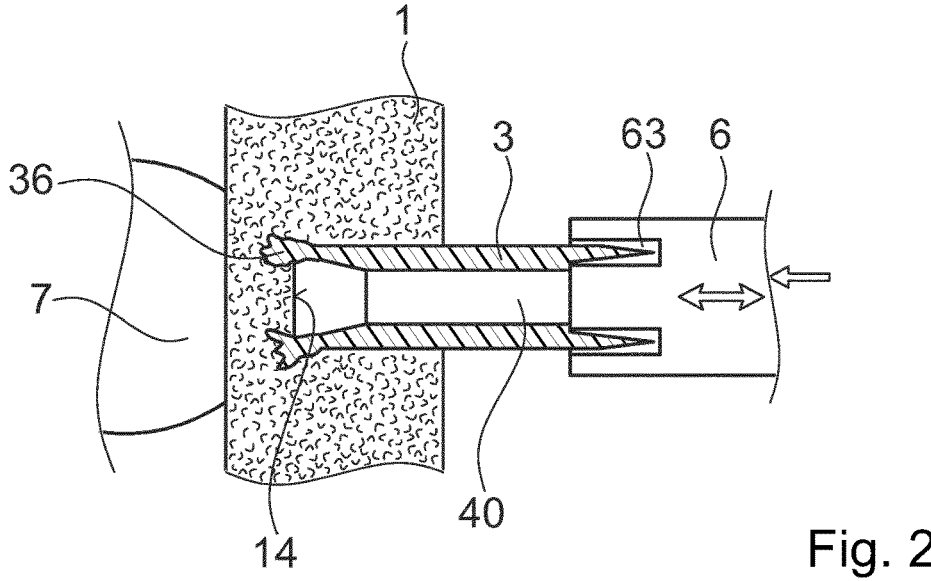
FIG. 2 shows the configuration of FIG. 1 during the first anchoring step.

Returning to the configuration shown in FIG. 1 and referring to FIG. 2, for anchoring the joining element in the first object, the sonotrode is used to press the joining element against the first object with the distal end abutting against the bottom face 14 until a flow portion 36 of the thermoplastic material of the joining element becomes flowable and is pressed into structures of the first object around the bottom face. As a result, after re-solidification, the joining element is anchored in the first object by a positive-fit connection, substantially as for example described in WO 98/42988.

FIG. 2 also schematically illustrates a support 7. In general, the support may be a non-vibrating support, such as for example formed by a working table, in which configuration the proximodistal axis would be oriented vertically, or by a different stationary or movable non-vibrating element. Alternatively, the support may itself be capable of coupling vibration energy into the assembly and therefore form a sonotrode itself. In accordance with this alternative, instead of being a sonotrode, as illustrated in all embodiments herein, the tool could also serve as mere pressing tool.

Figure 3:
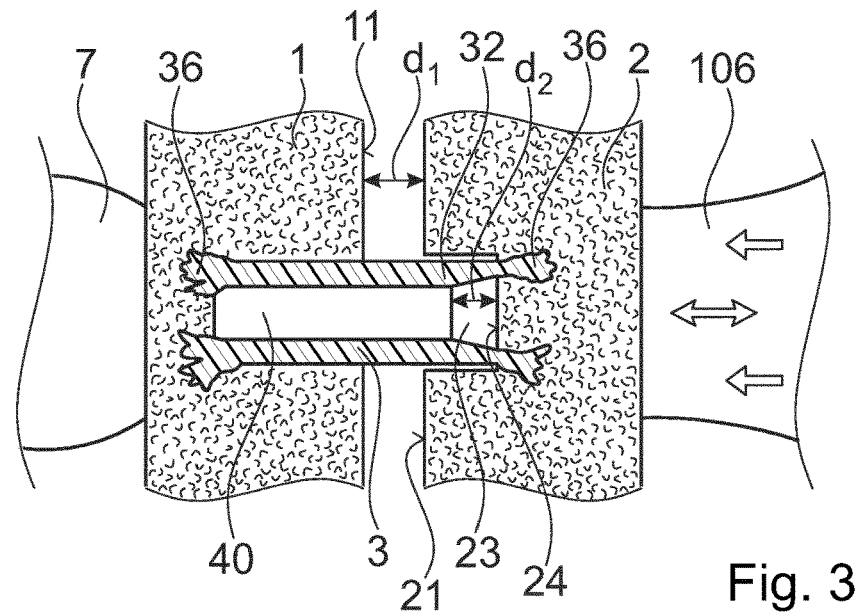
FIG. 3 depicts the configuration of FIGS. 1 and 2 with a second object during the second anchoring step.

FIG. 3 shows the assembly of the first object 1 and the joining element 3 anchored therein, together with a second object 2. The second object has a second blind hole 23 having a mouth in the distal surface 21. For joining the second object 2 to the first object, the second object is placed relative to the first object with the second object distal surface 21 facing the first object proximal surface 11 and with the proximal portion 32 at least partially inserted in the second blind hole 23. For the joining process, this assembly of the two objects with the joining element positioned in the blind holes is placed between a sonotrode 106 and a support 7. In this, the sonotrode may be the first sonotrode 6 as used in the previous step of anchoring the joining element in the first object, or, as shown in FIG. 3, it may be a different, second sonotrode 106. The same holds for the support 7: The support 7 may be a same support or may be a different support—for example depending on whether or not the first object is moved from a first to a second stage between the steps of anchoring the connector and of joining the second object.

Also in the second anchoring step, i.e. the step of joining the second object to the first object, the support 7 may be a non-vibrating support, or it may be vibrating. For example, the support 7 may be a working table or similar. Alternatively, it is for example possible that the configuration in this step is symmetrical, with the support 7 being a sonotrode acting from one horizontal side and the (second) sonotrode acting from an opposite horizontal side.

By the effect of a pressing force between the sonotrode 106 and the support 7, the proximal end of the joining element 3 is pressed against the bottom face 24 of the second blind hole 23. Due to the mechanical vibration energy coupled into the second sonotrode 106 at the same time, a (second) flow portion 37 of the joining element becomes flowable and is pressed into structures of the second object. In this, the fact that the proximal end of the joining element forms a proximal crown ending in the proximal edge and thereby has energy directing properties ensures that energy absorption primarily takes place at the proximal end of the connector. It is possible that also at the distal end of the connector there is some energy absorption leading to a heating of the thermoplastic material also there.

In the depicted configuration, the steps of pressing and coupling the vibration energy into the second objects are continued until the gap between the surfaces 11, 21 of the first and second objects is closed. A vibration generating apparatus control may be configured to detect the situation in which a further advance movement of the sonotrode relative to the first object towards distally is not possible anymore and to automatically stop the vibration energy input then. Optionally, the apparatus may be configured to exert an after-pressure for some time, for example for 0.3-3 s, to allow the thermoplastic material to become harder to some extent before the sonotrode is removed.

The result of the process will be the first and second objects being connected by the joining element as a kind of hidden dowel, in an efficient process and with superb anchoring strength.

It is also possible to anchor a plurality of joining elements in an according number of first blind openings in the first object and then to bring the second object together with the joining elements simultaneously using a sufficiently powerful apparatus and a sufficiently large second sonotrode to liquefy material of the proximal portions of these joining elements simultaneously.

FIG. 3 illustrates a further possible design criterion applicable to any embodiment. Namely, the dimension of the joining element 3 and the anchoring depth achieved in the first anchoring step on the one hand and the depths of the blind holes 13, 23 in the first and second objects on the other hand define a width $d_1$ of the gap. This width $d_1$ of the gap may be chosen in relation to an axial extension $d_2$ of the proximal portion (extension between the abutment face 37 and the proximal end 34). Especially, for a deep anchoring, the width of the gap may be approximately equal to and for example slightly larger than this axial extension.

In embodiments in which the proximal portion forms a crown, thereby the entire crown will have penetrated into material of the second object so as to ensure a secure and reproducible anchoring.

FIG. 5 illustrates the proximal portion 32 of the joining element together with of a distal end portion of a variant of the first sonotrode 6. In this variant, the first sonotrode has a distal end of a reduced diameter fitting into an interior of the proximal end of the joining element so as to cooperate with the abutment face 37. In this embodiment, the first sonotrode 6 does not need a recess for accommodating the crown of the joining element.

In the variant of FIG. 6, the abutment face 37 is not an inner shoulder but an outer shoulder. While the configuration with an inner shoulder forming the abutment face has the advantages of the crown (and the proximal edge 34) having a potentially larger diameter with the possibility of having more material liquefied and of an outer surface of the proximal portion contributing to the anchoring (see hereinafter), nevertheless there may be configurations in which the abutment surface forming an outer shoulder may be advantageous, too.

Combinations of an outer and an inner shoulder (at same or different axial positions) are possible. Also, staggered arrangements of shoulders together forming the abutment face or configurations with inclined abutments face portions are possible also.

In the embodiments of FIGS. 1-5, the receiving opening 63 is illustrated to be shaped so that there is substantially no physical contact between the proximal crown of the joining element and the inner surfaces of the receiving opening.

FIG. 7 depicts an alternative embodiment in which the shapes of the receiving opening 63 and the proximal portion 32 of the joining element are adapted to each other so that the crown exactly fits into the receiving opening. This may lead to a more intimate contact between the sonotrode and the joining element and may ultimately enhance an efficiency of the product. Additionally, the relative positions of the sonotrode and the joining element during the process are defined more precisely, and the risk of causing damages on the proximal end of the joining elements during the process is thereby reduced.

A dedicated shape of the receiving opening of the sonotrode may also be used to deliberately bring the distal portion of the joining element into such shape. This is schematically illustrated (in somewhat exaggerated manner) in FIG. 8. The joining element is illustrated to have a blunt proximal end, whereas the receiving opening 63 has a shape that corresponds to the shape of a tapering crown ending in an edge. When the sonotrode 6 is pressed against the joining element with the proximal end of the joining element inserted in the receiving opening 63, thermoplastic material of the proximal end will be caused to soften and to flow relative to the sonotrode, whereby the receiving opening (or at least an inner, proximal part of it) serves as a mold for shaping the joining element for the subsequent step of being connected to the second object.

Generally embodiments in which a receiving opening of the sonotrode serves as a mold may be advantageous especially if the crown is relatively thin compared to its axial extension, i.e. if it is delicate. This may for example be the case if the second object is comparably soft or itself of a delicate structure, whereby the energy absorbed during the second anchoring step is limited, but nevertheless a sufficient anchoring depth is needed. In a situation with a delicate crown shape, a pre-made proximal crown capable of vibrating freely could become damaged already in the first anchoring step. The approach of causing a receiving opening of the sonotrode to serve as a mold deals with this issue in an efficient manner.

FIG. 9 shows a longitudinal section of a joining element 3, and FIG. 10 shows a view on this joining element from a proximal direction. In addition to the embodiments described referring to FIGS. 1-5 and 7, the joining element 3 has the following characteristics, which are independent of each other, i.e. which can be realized individually or in combinations:

The joining element has axially running ribs 41 distributed around the periphery. These ribs have directing properties. The diameter of the joining element including these energy directing ribs may be approximately equal to or slightly larger than a diameter of the blind holes 13, 23. Such energy directing ribs assist in liquefying the portions of the thermoplastic material of the joining element not only in physical contact with the bottom faces of the blind holes but also in contact with the circumferential walls, whereby portions of the thermoplastic material interpenetrate structures of the first and/or second object also in a vicinity of the circumferential walls of the blind holes so as to assist anchoring in these walls.

The joining element in addition to having a proximally facing shoulder in the region of the proximal section forming the abutment face 37, the joining element has a distally facing shoulder 38 at a corresponding distal position. Thereby, the joining element may be inserted in the blind opening in the first object also in a reverse configuration, i.e. with the proximal and distal portions exchanged. For example, the joining element may be symmetrical with respect to a middle plane perpendicular to the proximodistal axis, with the possible exception of a partition wall or membrane as described hereinafter.

The joining element has a partition member 43 having the shape of a wall or partition membrane that extends transversally across the hollow space 40. Such partition member 43 may firstly have the function of assisting in a process of removing the tool (sonotrode 6) from the joining element after anchoring the same in the first object. In this, a temporary air overpressure may be generated between the sonotrode 6 and the partition member 43 while the sonotrode 6 is retracted. In addition or as an alternative, the partition member 43 may allow for an air-based feeding system in which air pressure is used to feed/position the joining element. In addition or as yet another alternative, the partition member 43 may be used to enhance the effectiveness of the coupling-in of the mechanical vibration energy in that it forms part of the abutment surface (abutment surface portion 39) and cooperates with a correspondingly shaped coupling-out surface portion 66 of the sonotrode (see FIG. 11 described hereinafter).

In addition to having an inner taper 47, the joining element in the distal and proximal sections 31, 32 also has an outer taper 48 so that an outer diameter of the joining element gradually reduces towards the distal and proximal edges.

The removal of the first sonotrode after anchoring the joining element relative to the first object may especially be an issue if the shape of the receiving opening 63 is adapted to the proximal portion 32 of the joining element and/or is used to shape this proximal portion, as described hereinbefore. In an efficient process, it may be desirable to remove the sonotrode before the thermoplastic material has fully hardened, and one has to make sure that adhesion between the sonotrode and the joining element does not loosen the anchoring in the first object and/or distort the shape of the joining element in this condition. In addition or as an alternative to using an air blast, it is also possible to use a mechanical element (push-out plunger or the like) for this purpose, and/or to activate the sonotrode by coupling vibration into it or keep the sonotrode activated during the removal process.

FIG. 11 shows an example of a sonotrode having a shape adapted to the shape of the joining element of FIGS. 9 and 10. In the embodiment of FIG. 11, in addition to an outcoupling face 65 that cooperates with the shoulder 37 forming the abutment face (or a proximal portion thereof), the sonotrode has a second outcoupling face 66 located centrally with respect to the axis, which second outcoupling face is positioned to be pressed against the partition member 43 (if any) or a second shoulder of the joining element. The sonotrode of FIG. 11 works independent of the existence of the partition member or such second shoulder, though. The outcoupling face 65 and for example also the (optional) second outcoupling face 66 is/are offset towards proximally with respect to the distal end face 61 in the depicted embodiment.

FIG. 12 illustrates the principle that it is not necessary for the joining element to be positioned to rest against a bottom face of the blind opening 13. In fact, the opening in the first object 1 (and similarly in the second object) does not even have to be a blind opening. In FIG. 12, the opening is illustrated as a deep blind opening having a diameter $d_r$. The dimension of the joining element are adapted for there to be a press-fit (interference fit) if the joining element's distal section is inserted into the opening. To this end, an outer diameter $d_j$ is slightly larger than the diameter $d_r$ of the opening.

The approach of causing, after establishing an interference fit, anchoring of an inserted portion in an opening by transferring mechanical vibration energy for liquefaction of thermoplastic material and interpenetration of structures around the opening by this thermoplastic material has been described for example in WO 2015/181300.

FIG. 13 schematically illustrates a further embodiment of a joining element, which further embodiment has the following characteristics that differ from characteristics of the joining element of FIGS. 9 and 10 and that are independent of each other:

The joining element 3 is not hollow and tube-like but has a full cross section forming towards the distal and proximal ends, a distal and a proximal recess 44, 45. Such a full joining element requires more material and has the property of being more rigid. In some embodiments, for example if substantial shear forces are expected between the first and second objects, this enhanced rigidity may be an advantage. Also, the bottom face of the proximal recess 45 (which may, in case of a symmetrical joining element, be indistinguishable from the distal recess) may serve as a stable abutment face or portion thereof.

In addition or as an alternative to having a full cross section, the joining element may have a portion 49 of a material different from the thermoplastic material, for example of a metal. Such metallic part, for example metallic core, may contribute to the mechanical stability of the joining element and make the joining element suitable for situations in which very strong shear forces between the first and second objects need to be absorbed.

Figures 14, 15:
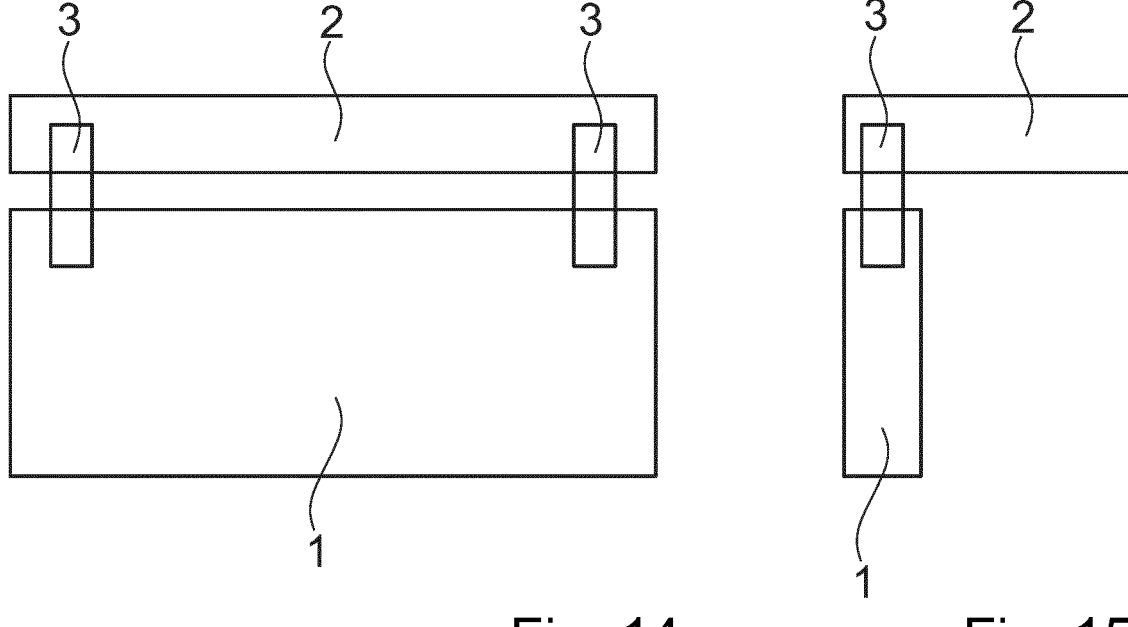
FIGS. 14 and 15 illustrate an arrangement of a first and a second object, together with two joining elements.

FIGS. 14 and 15 very schematically illustrate the fact that the approach according to the present invention is especially suited for configurations in which the first and second objects have different properties in terms of material composition, shape, dimension, orientation etc. In the configuration illustrated in schematical front view and side view in FIGS. 14 and 15, respectively, the openings—being blind openings—for the two joining elements 3 are in a small-side face of the first object and in a large-side face of the second object-respectively.

FIGS. 14 and 15 also very schematically illustrates the principle that at least the second anchoring step, in which the first and second objects are pressed against each other, with the joining element(s) already being anchored relative to the first object, may be a parallel process, carried out for a plurality of (two in FIGS. 14/15) joining elements at the same time. A parallel process is an option for the first anchoring step, too, especially if not carried out by a handheld tool.

For a process as illustrated in FIGS. 14 and 15, in which a plurality of joining elements is attached to the second object in one go, a plurality of sonotrodes (for example one sonotrode per joining element) may be used simultaneously. In situations with joining elements being placed close to each other, it is also possible to use one sonotrode to couple the energy into more than one joining element simultaneously.

The embodiments described hereinbefore include an opening—namely a blind hole in the shown embodiments—both, in the first and in the second object. Depending on the properties of the first and second objects, this is not necessary. Rather, the first object or the second object or both, the first and the second object may be provided without any such blind opening, and the respective anchoring step may include pressing the joining element through a surface of the first/second object into the first/second object without any pre-made opening. This principle is illustrated with respect to FIGS. 16 and 17, where the first and second objects are both illustrated without any opening and are both illustrated to be—different—lightweight building elements, namely sandwich boards. However, it also applies to situations with one of the objects having an opening, and it applies to configurations with the first and/or second object of different constitution than being a sandwich board.

Figure 16:
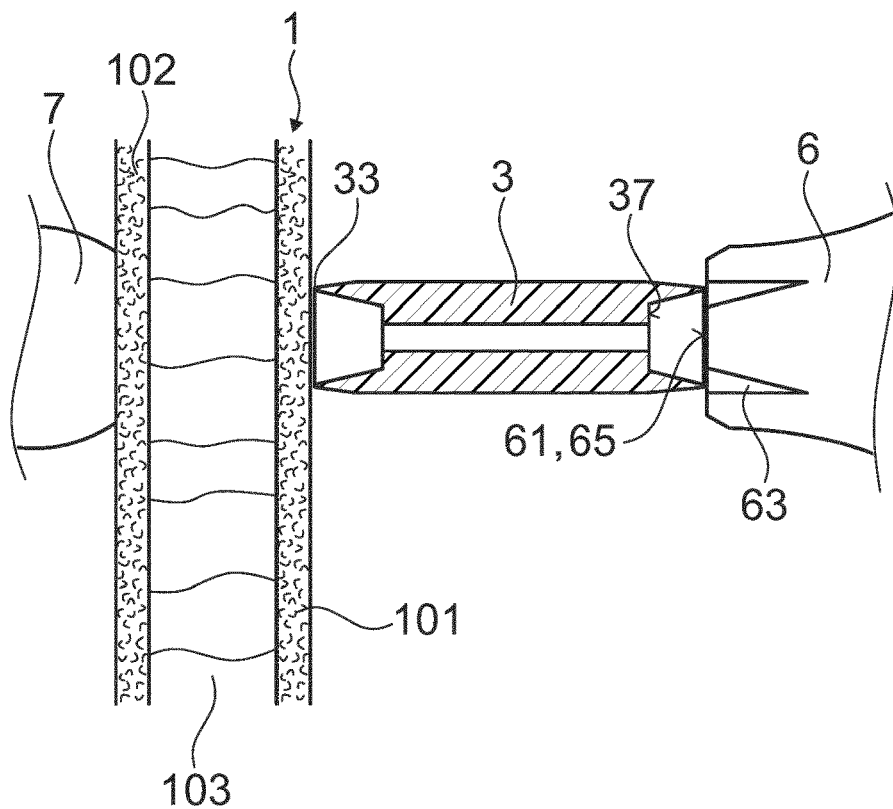
FIGS. 16 and 17 illustrate alternative configurations prior to the first and second anchoring step, respectively.

FIG. 16 shows a first object 1 that is a lightweight building element having a first, proximal outer building layer 101, a second, distal outer building layer 102 and an interlining layer 103 having a density and material stiffness substantially smaller than densities/stiffnesses of the outer building layers 101, 102. The first object in does not have an opening.

When the sonotrode 6 is used to press the connector 3 against the first outer building layer by the outcoupling face 65 being pressed against the abutment face 37, for example as described hereinbefore, the joining element is pushed through a surface of the first object. For example, the distal edge 33 may punch out a portion of the first outer building layer 101, with or without mechanical vibration energy being input during the punching, substantially as described in WO 2017/162693. More in general, if the first object is a lightweight building element having a sandwich structure, the distal end of the joining element is used to pierce through the first outer building layer.

Thereafter, the joining element advances towards distally into material of the first object and thermoplastic material of the distal portion liquefies in contact with structures of the first outer building layer, the interlining layer and/or the second outer building layer.

Figure 17:
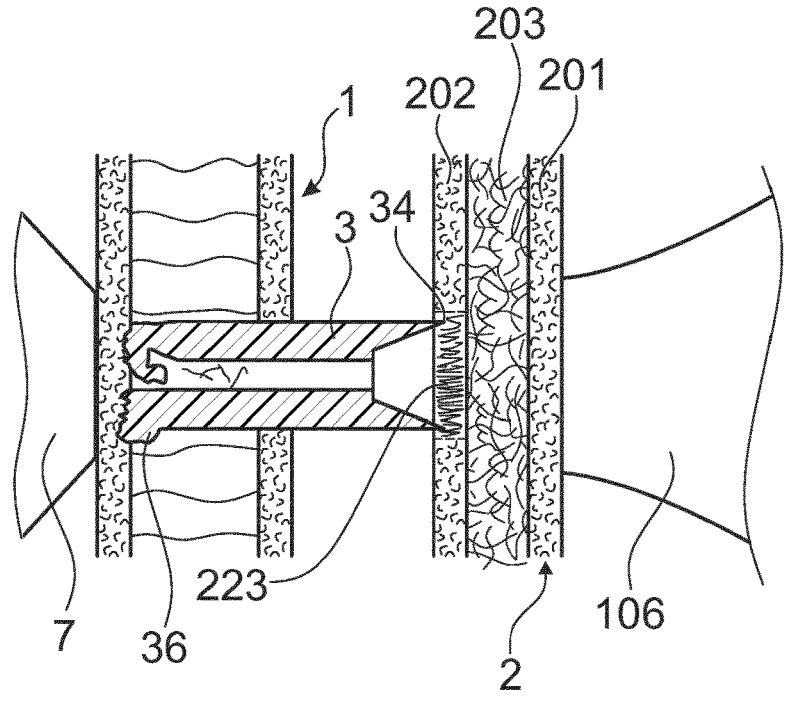

FIG. 17 shows the resulting arrangement, together with the second object 2 and a second sonotrode 106. Also the second object 2 is a lightweight building element with first and second outer building layers 201, 202 and an interlining layer 203 of lower density and strength. Also the second object 2 is shown without any opening.

However, an optional opening 223, for example consisting only of the first outer building layer 202 being locally removed, is sketched also, for the case that the proximal edge 34 of the joining element is not sufficiently sharp and/or stable to pierce the second outer building layer 202 of the second object and/or for the case the anchoring of the joining element in the first object is not sufficiently stable and/or the second object as a whole does not have a sufficient stability. The reverse situation (the first object having the first outer building layer locally removed, whereas the second object does not) is possible also.

Figure 18:
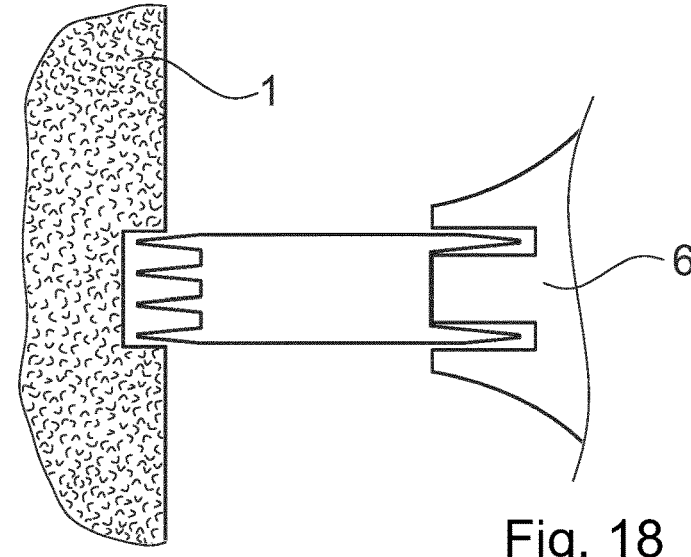
FIG. 18 shows a configuration similar to FIG. 1 for the first anchoring step, but with a different first object material and with an accordingly adapted joining element.

In the previously described embodiments, the materials of the first and second objects were illustrated to be hard and dimensionally stable (with the possible exception of the interlining layer 103 of the lightweight building element in the example of FIG. 16). This is not a necessity. FIG. 18 illustrates the first object 1 as a comparably soft foam, for example an Expanded Polypropylene (EPP) foam. The distal end of the joining element may then have accordingly adapted structure for anchoring in softer compressible material, for example substantially as described in WO 2018/85, for example referring to FIG. 4-9, 28, 34-47. The blind hole in the first object may have a reduced depth for taking into account the compression of the first object during the first anchoring step; depending on the situation, the blind hole in the first object may even be omitted.

Figure 19:
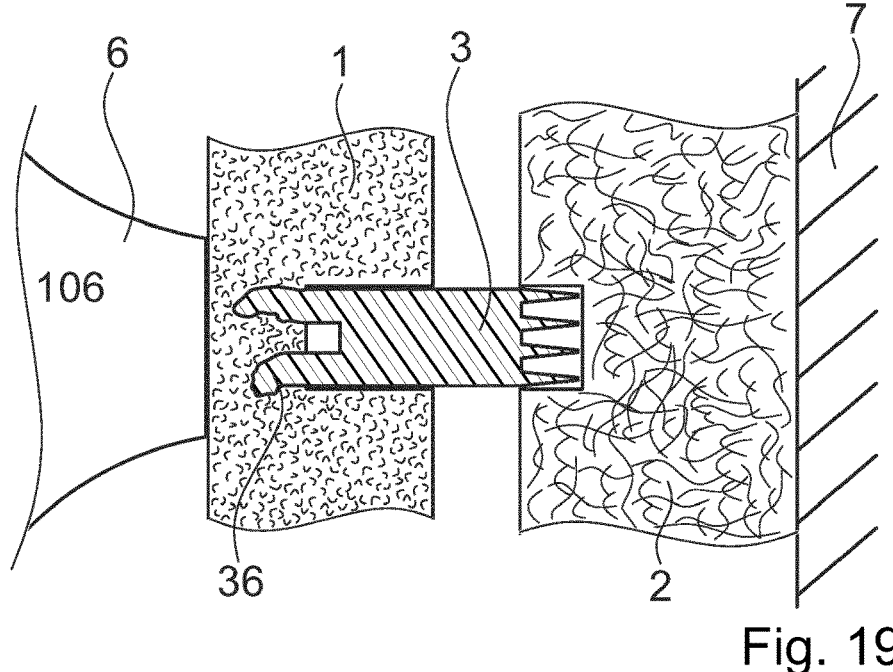
FIG. 19 shows an even further configuration of a first object, a second object, and a joining element during the second anchoring step, with a different second object material and an accordingly adapted joining element.

FIG. 19 shows a variant in which instead of the first object, the second object 2 is of a comparably softer material, here illustrated to be a fibrous material. In this, it may be the proximal end of the joining element that has an accordingly adapted structure, for example as described in WO 2018/85, for example referring to FIG. 4-9, 28, 34-47.

A configuration as illustrated in FIG. 19 with the second object being of a softer material than the first object is at the same time an example of an embodiment in which the vibration energy for the second anchoring step is coupled into the assembly from the first object side, as illustrated by the (second) sonotrode 106 being pressed against the backside (distal surface) of the first object, while the assembly is pressed against a non-vibrating support 7 that is proximally of the second object 2. The vibration in this is coupled through the first object 1 and the joining element 3 to the interface between the joining element 3 and the second object 2.

Figure 20:
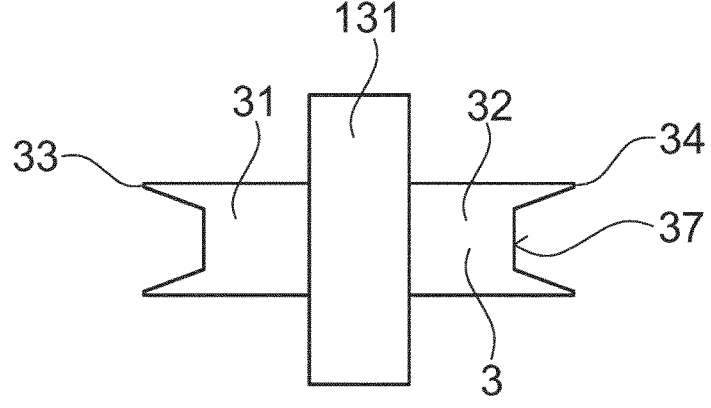
FIG. 20 depicts a joining element with a spacer portion.
Figure 21:
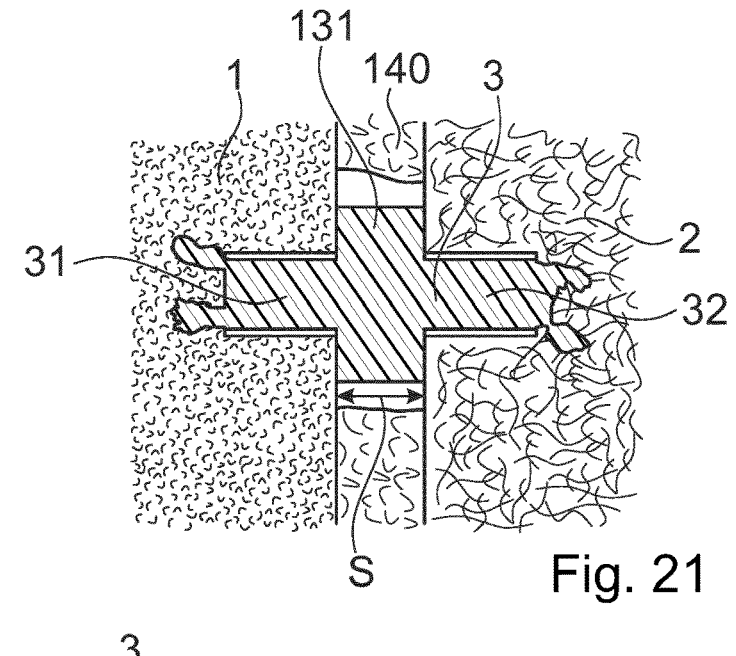
FIG. 21 shows a configuration with the joining element of FIG. 20 used for defining an adhesive gap.

FIG. 20 shows a connector being useable both, in the first aspect and in the second aspect of the present invention. The connector has a distal portion 31 and a proximal portion 32, substantially as described hereinbefore, and further has a laterally protruding spacer portion 131. As illustrated in FIG. 21, the spacer portion 131 may be used to define a remaining gap between the first and second objects 1, 2. In the step of pressing the first and second objects against each other, the spacer portion stops the movement of the first and second objects towards each other. The width of the remaining gap corresponds to a thickness of the spacer portion.

An adhesive 140 may be applied prior to the step of pressing the first and second objects against each other (or also thereafter), whereby the remaining gap serves as adhesive gap.

Figure 22:
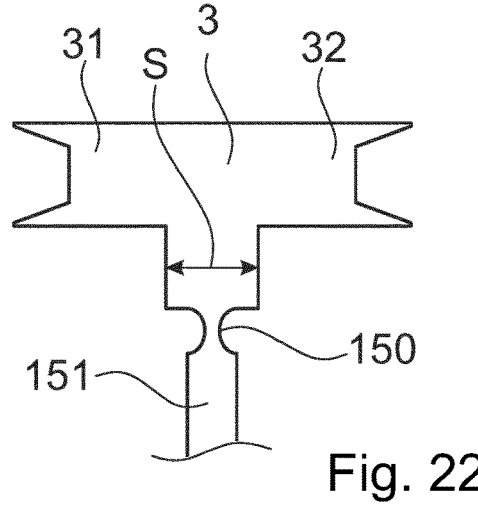
FIGS. 22 and 23 illustrate further variants of joining elements.

A remaining gap may also have other uses. FIG. 22 schematically illustrates a joining element 3 with a distal portion 31 and a proximal portion 32, substantially as described hereinbefore, and further with a lateral hinge 150 which a further object or structure (not shown) may be attached via a swiveling portion 151.

A hinge may also be present between the distal portion and the proximal portion, if in a neutral position (distal portion and proximal portion aligned) the hinge provides sufficient axial stiffness for the (second or only) anchoring step to take place. Thereby, the first and second objects may be connected to each other in a swiveling manner, which may have interesting applications for door, window or furniture manufacturing.

Figure 23:
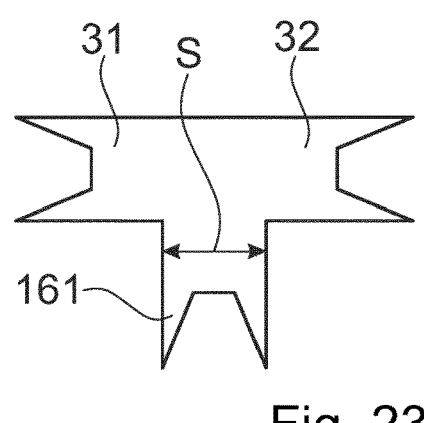

FIG. 23 very schematically illustrates the possibility of providing the joining element with a further connecting structure 161 for attaching a third object to the assembly of the first and second objects. The further connecting structure is illustrated as a further anchoring structure of the kind of the distal and proximal portions 31, 32. However, any connector structure may be used, including conventional structures, such as a thread etc.

In FIGS. 22 and 23, the arrow S illustrates the width of the spacer portion defining the width of the remaining gap.

The joining elements of FIGS. 20-23 may also be used in a method deviating from the first aspect but being according to the second aspect.

Figure 24:
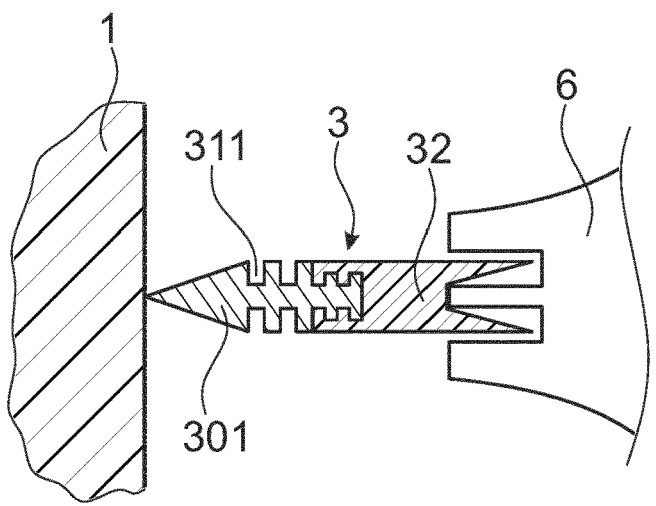
FIG. 24 shows an example of the third aspect of the invention.

The configuration of FIG. 24 includes a first object 1, a joining element 3 and a sonotrode 6 for carrying out the first anchoring step in a method according to the third aspect of the invention. The joining element includes a distal portion 311 that is metallic and a proximal portion 32 that is thermoplastic and that may be configured substantially as described for joining elements for the first and second aspects.

The first anchoring step is carried out substantially as described in WO 2016/071 335, but with a sonotrode that abuts against an abutment face of the joining element, which abutment face is distally of the proximal end, similar to the first aspect. To this end, the sonotrode 6 and the proximal portion 32 may be shaped and configured as in any embodiment of the first aspect, whereas the distal portion 311 is different and may have a structure and configuration as in any embodiment of the second object described in WO 2016/071 335. The second anchoring step is then carried out as in the first aspect. All options and features that relate to the second anchoring step according to the first aspect and all features and options that relate to the proximal portion of the joining element used for the first aspect apply as options equally to the third aspect.

What is claimed is:

1. A method of joining a first and a second object with the aid of a joining element, the method comprising the steps of:
   providing the first object;
   providing the joining element, the joining element extending between a distal end and a proximal end and comprising a thermoplastic material;
   positioning the joining element relative to the first object;
   using a tool to press the joining element towards distally relative to the first object while energy is coupled into the first object and/or the joining element, until a first portion of the thermoplastic material belonging to a distal portion of the joining element, the distal portion comprising the distal end, is made flowable and is caused to flow into a structure of the first object to yield, after re-solidification, an anchoring of the distal portion of the joining element in the first object;
   wherein during the step of coupling of the energy into the first object and/or the joining element, a pressing face of the tool abuts against an abutment face of the joining element, which abutment face is distally of the proximal end;
   providing the second object having a second opening being a blind hole;
   placing the second object relative to the first object, wherein the second object is placed so that the protruding proximal portion of the joining element is inserted into the second opening; and
   pressing the first and second objects against each other causing the distal end of the joining element to be pressed against a bottom face of the second opening and, during pressing, coupling mechanical vibration energy into at least one of the first and second objects, until a second portion of the thermoplastic material belonging to a proximal portion of the joining element, the proximal portion comprising the proximal end, is made flowable and is caused to flow into a structure of the second object to yield, after re-solidification, a fixation between the joining element and the second object.

2. The method according to claim 1, wherein in the step of providing the first object, the first object has a first opening, and wherein in the step of positioning the joining element relative to the first object, positioning is effected so that the distal portion is inserted in the first opening and the proximal portion protrudes from the first object, wherein the first opening is a blind hole, and wherein the step of using the tool to press the joining element towards distally comprises pressing the distal end of the joining element against a bottom face of the first opening.

3. The method according to claim 1, wherein after the step of placing the second object relative to the first object, a gap remains between the first and second objects, wherein as a result of the step of pressing the first and second objects against each other while mechanical vibration energy impinges, the gap is closed.

4. The method according to claim 1, wherein after the step of placing the second object relative to the first object, a gap remains between the first and second objects, wherein as a result of the step of pressing the first and second objects against each other while mechanical vibration energy impinges, a width of the gap is reduced from an initial width to a final width, the final width being different from zero.

5. The method according to claim 4, wherein the joining element has a laterally protruding spacer portion, and wherein the step of pressing the first and second objects against each other is carried out until both, the first and second objects abut against the spacer portion, whereby the spacer portion sets the final width.

6. The method according to claim 5, further comprising placing a glue between the first and second objects, and the method further comprising allowing the glue to harden in the gap having the final width.

7. The method according to claim 1, wherein the first object has a first opening, wherein in the step of positioning the joining element relative to the first object, positioning is effected so that the distal portion is inserted in the first opening and the proximal portion protrudes from the first object, wherein both, the first and second openings each are blind holes, and wherein a sum of depths of the first and second openings is smaller than a proximodistal length of the joining element.

8. The method according to claim 1, wherein the energy coupled into the first object and/or the joining element is mechanical vibration energy, and wherein the tool is a sonotrode, with the pressing face being an outcoupling face, and wherein in the step of coupling energy into the first object and/or the joining element, at least a fraction of the mechanical vibration energy is coupled into the joining element by the sonotrode.

9. The method according to claim 1, wherein the abutment face comprises a shoulder of the joining element, and wherein the shoulder is an inner shoulder.

10. The method according to claim 1, wherein the joining element comprises at least one of:

a proximal crown of the thermoplastic material proximally of the abutment face;

a distal crown;

a proximal blade-like protrusion ending in an edge at the proximal end; or a distal blade-like protrusion ending in an edge at the distal end.

11. The method according to claim 1, wherein the joining element is tube shaped and hollow.

12. The method according to claim 2, wherein the joining element has a plurality of energy directing ribs protruding from an outer surface;

wherein the energy directing ribs run in an axial direction or run helically around the outer surface;

wherein as a result of positioning the joining element relative to the first object, the energy directing ribs are in physical contact with a circumferential wall of the first opening, and during the step of using the tool to press the joining element towards distally, thermoplastic material of the joining element is caused to flow into structures of the first object also in a vicinity of the circumferential wall of the first opening; and wherein as a result of placing the second object relative to the first object, the energy directing ribs are in physical contact with a circumferential wall of the second opening, and during the step of pressing the first and second objects against each other, thermoplastic material of the joining element is caused to flow into structures of the second object also in a vicinity of the circumferential wall of the second opening.

13. The method according to claim 1, wherein the tool has a distal recess having a mouth in a distal tool end face, and wherein during the step of using the tool to press the joining element towards distally, the proximal portion of the joining element is received in the distal recess; and wherein the distal recess has a shape adapted to a shape of the proximal portion of the joining element.

14. The method according to claim 1, wherein the tool has a protruding portion that that during the step of using the tool to press the joining element towards distally, extends past at least a part of the proximal portion of the joining element.

15. The method according to claim 1, and comprising the step of shaping the proximal portion of the joining element during the step of using the tool to press the joining element towards distally by the joint effect of the pressing force and the energy.

16. The method according to claim 15, wherein the step of shaping the proximal portion of the joining element comprises shaping the proximal portion to form a blade-like protrusion and/or a crown circumferentially around a central hollow space;

wherein the crown forms, at the proximal end, a continuous edge, or wherein the blade-like protrusion or crown extends around the central hollow space in a discontinuous manner, having a plurality of teeth arranged around the central hollow space.

17. The method according to claim 1, wherein after the step of using the tool to press the joining element towards distally and prior to the step of placing the second object relative to the first object, the tool is disengaged from the joining element, and wherein disengaging the tool is assisted by at least one of an air blast, a push-out plunger, coupling vibration energy into the tool.

18. A method of joining a first and a second object with the aid of a joining element, the method comprising the steps of:

providing the first object;

providing the second object, the second object having a second opening being a blind hole;

providing the joining element, the joining element extending between a distal end and a proximal end and comprising a thermoplastic material;

positioning the joining element relative to the first object and relative to the second object such that according to a first option the distal end of the joining element is in contact with the first object and according to a second option, the distal end of the joining element is anchored in the first object, such that the proximal end of the joining element protrudes into the second opening and is in contact with a bottom face of the second opening, and such that there is a gap between the first and second objects, the gap having an initial gap width;

pressing the first and second objects against each other while mechanical vibration energy is coupled into at least one of the first and second objects, until a portion of the thermoplastic material belonging to a proximal portion of the joining element, the proximal portion comprising the proximal end, is made flowable and is caused to flow into a structure of the second object to yield, after re-solidification, a fixation between the joining element and the second object, wherein as a result of the step of pressing the first and second objects against each other, the first and second objects are moved towards each other until the gap has a smaller final gap width, which final gap width is different from zero, and wherein according to the first option, the step of pressing the first and second objects against each other while mechanical vibration energy is coupled into at least one of the first and second objects causes a portion of the thermoplastic material belonging to a distal portion of the joining element, the distal portion comprising the distal end, is made flowable and is caused to flow into a structure of the first object to yield, after re-solidification, a fixation between the joining element and the first object.

19. The method according to claim 18, wherein the joining element has a laterally protruding spacer portion, and wherein the step of pressing the first and second objects against each other is carried out until both, the first and second objects abut against the spacer portion, whereby the spacer portion sets the final width.

20. The method according to claim 18, further comprising placing a glue between the first and second objects, and the method further comprising allowing the glue to harden in the gap having the final width.

21. The method according to claim 18, wherein in the step of providing the first object, the first object has a first opening, wherein in the step of positioning the joining element relative to the first object, positioning is effected so that the distal portion is inserted in the first opening and the proximal portion protrudes from the first object;

wherein in the step of providing the second object, the second object has a second opening; and wherein in the step of placing the second object relative to the first object, the second object is placed so that the protruding proximal portion of the joining element is inserted into the second opening.

22. A method of joining a first and a second object with the aid of a joining element, the method comprising the steps of:

providing the first object, the first object comprising a thermoplastic liquefiable material in a solid state;

providing the joining element, the joining element extending between a distal end and a proximal end, the joining element comprising:

a distal portion with the distal end, the distal portion comprising a surface portion that has a coupling structure with an undercut and/or is capable of being deformed to comprise such a coupling structure with an undercut, whereby the distal portion is capable of making a positive-fit connection with the first object, and a proximal portion comprising a proximal crown of a thermoplastic material;

the joining element comprising an abutment face, and the proximal crown extending proximally of the abutment face;

positioning the joining element relative to the first object;

using a tool to press the joining element towards distally relative to the first object while energy is coupled into the first object and/or the joining element, until a flow portion of the thermoplastic material of the first object is liquefied and flows into the coupling structures of the joining element to yield, after re-solidification, an anchoring of the distal portion of the joining element in the first object;

wherein during the step of coupling of the energy into the first object and/or the joining element, a pressing face of the tool abuts against the abutment face;

providing the second object;

placing the second object relative to the first object; and pressing the first and second objects against each other while mechanical vibration energy is coupled into at least one of the first and second objects, until a second portion of the thermoplastic material belonging to a proximal portion of the joining element, the proximal portion comprising the proximal end, is made flowable and is caused to flow into a structure of the second object to yield, after re-solidification, a fixation between the joining element and the second object.

* * * * *